US010210909B2

(12) United States Patent
Mori et al.

(10) Patent No.: US 10,210,909 B2
(45) Date of Patent: Feb. 19, 2019

(54) COMPUTER IMPLEMENTED METHOD FOR USE IN A PLAY BACK APPARATUS

(71) Applicant: Panasonic Intellectual Property Corporation of America, Torrance, CA (US)

(72) Inventors: Yoshihiro Mori, Osaka (JP); Masayuki Kozuka, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 5 days.

(21) Appl. No.: 15/183,950

(22) Filed: Jun. 16, 2016

(65) Prior Publication Data

US 2016/0293222 A1 Oct. 6, 2016

Related U.S. Application Data

(63) Continuation of application No. PCT/JP2015/005671, filed on Nov. 13, 2015.
(Continued)

(30) Foreign Application Priority Data

Oct. 29, 2015 (JP) .................................. 2015-213059

(51) Int. Cl.
*G11B 27/36* (2006.01)
*H04N 21/472* (2011.01)
(Continued)

(52) U.S. Cl.
CPC ............ *G11B 27/36* (2013.01); *G11B 27/105* (2013.01); *G11B 27/11* (2013.01); *G11B 27/34* (2013.01);
(Continued)

(58) Field of Classification Search
CPC .................... G11B 27/36; H04N 21/43615
(Continued)

(56) References Cited

U.S. PATENT DOCUMENTS

2008/0165202 A1 7/2008 Brodersen et al.
2009/0150961 A1 6/2009 Kabuto et al.
(Continued)

FOREIGN PATENT DOCUMENTS

EP 2945392 A1 11/2015
JP 2009-141719 6/2009
(Continued)

OTHER PUBLICATIONS

International Search Report of PCT application No. PCT/JP2015/005671 dated Dec. 22, 2015.
(Continued)

*Primary Examiner* — Thai Q Tran
*Assistant Examiner* — Girumsew Wendmagegn
(74) *Attorney, Agent, or Firm* — Greenblum & Bernstein, P.L.C.

(57) ABSTRACT

A computer-implemented method is provided that includes determining whether a display apparatus that displays video played back by a playback apparatus supports an optional feature for playback of the video by using a first technique. The method also includes determining whether the display apparatus supports the optional feature for playback of the video by using a second technique that differs from the first technique in case that it is indeterminate whether the display apparatus supports the optional feature by using the first technique.

6 Claims, 15 Drawing Sheets

Related U.S. Application Data

(60) Provisional application No. 62/105,352, filed on Jan. 20, 2015.

(51) Int. Cl.

| | | |
|---|---|---|
| *H04N 21/436* | (2011.01) | |
| *H04N 21/4363* | (2011.01) | |
| *H04N 21/81* | (2011.01) | |
| *H04N 21/485* | (2011.01) | |
| *H04N 21/6547* | (2011.01) | |
| *H04N 21/658* | (2011.01) | |
| *G11B 27/10* | (2006.01) | |
| *G11B 27/11* | (2006.01) | |
| *G11B 27/34* | (2006.01) | |
| *H04N 5/765* | (2006.01) | |
| *H04N 5/93* | (2006.01) | |

(52) U.S. Cl.
CPC ............... *H04N 5/765* (2013.01); *H04N 5/93* (2013.01); *H04N 21/43615* (2013.01); *H04N 21/43635* (2013.01); *H04N 21/47217* (2013.01); *H04N 21/485* (2013.01); *H04N 21/6547* (2013.01); *H04N 21/6582* (2013.01); *H04N 21/816* (2013.01); *G11B 2220/2541* (2013.01)

(58) Field of Classification Search
USPC .......................................................... 386/241
See application file for complete search history.

(56) References Cited

U.S. PATENT DOCUMENTS

| | | | | |
|---|---|---|---|---|
| 2012/0032783 | A1* | 2/2012 | Ahn .................... | G06F 3/1423 340/6.1 |
| 2014/0282678 | A1* | 9/2014 | Rodriguez ......... | H04N 21/4516 725/25 |

FOREIGN PATENT DOCUMENTS

| | | |
|---|---|---|
| WO | 2012/172460 A1 | 12/2012 |
| WO | 2014/109322 A1 | 7/2014 |

OTHER PUBLICATIONS

Extended European Search Report, dated Dec. 1, 2017 from the European Patent Office (EPO), for the related European Patent Application No. 15866381.5.

\* cited by examiner

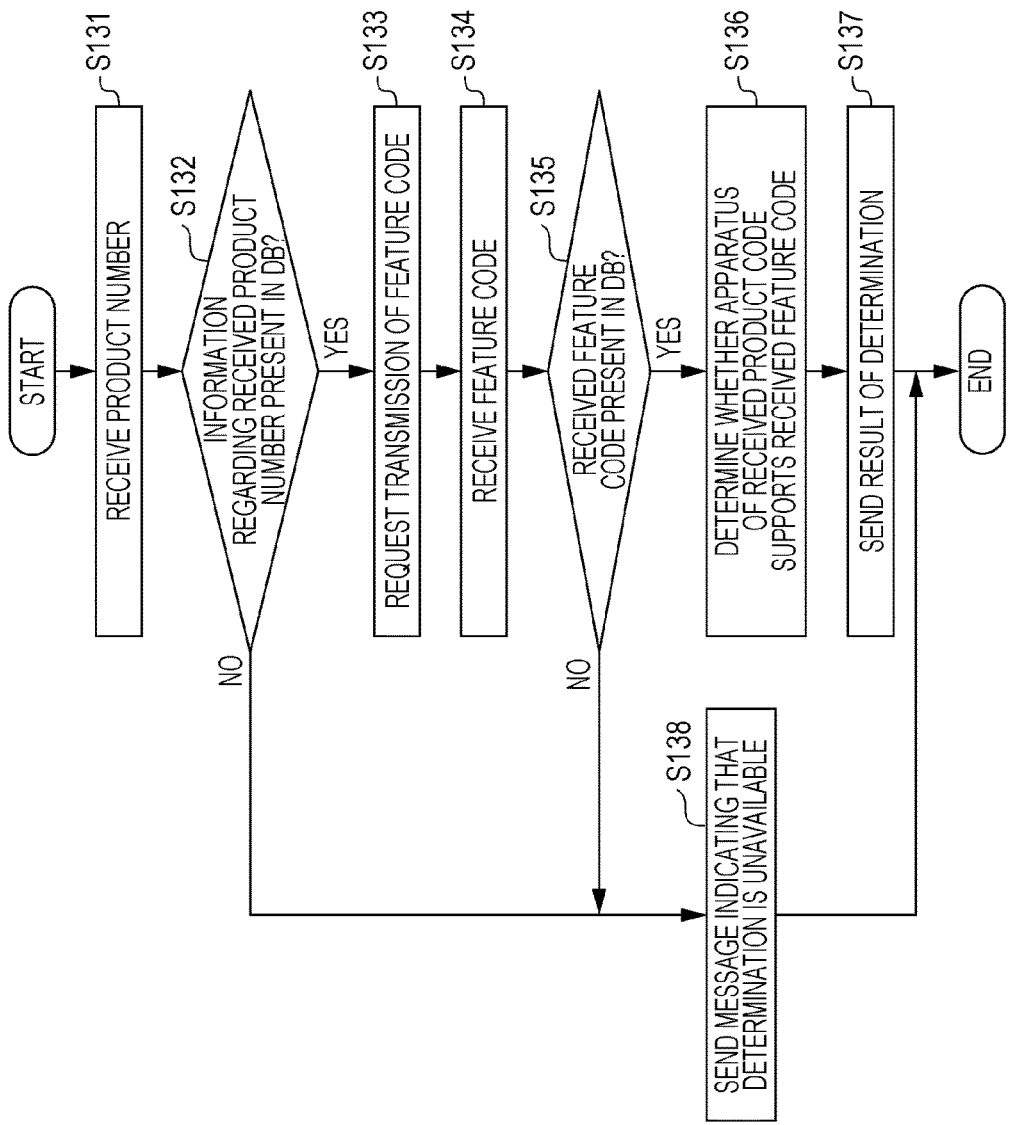

FIG. 6

| ID | MANUFACTURER | PRODUCT NUMBER | FEATURE 1 | FEATURE 2 | FEATURE 3 | FEATURE 4 | CONFIRMATION |
|---|---|---|---|---|---|---|---|
| 1 | A | XXX-X500 | SUPPORTED | UNSUPPORTED | UNSUPPORTED | UNSUPPORTED | ON |
| 2 | A | XXX-X700 | SUPPORTED | SUPPORTED | UNSUPPORTED | UNSUPPORTED | OFF |
| 3 | A | XXX-X900 | SUPPORTED | UNSUPPORTED | SUPPORTED | UNSUPPORTED | ON |
| 4 | B | BBB-B150 | SUPPORTED | UNSUPPORTED | SUPPORTED | SUPPORTED | ON |
| 5 | B | BBB-B250 | SUPPORTED | SUPPORTED | SUPPORTED | SUPPORTED | OFF |

| ID | USER ID | SYSTEM ID | FEATURE 1 | FEATURE 2 | FEATURE 3 | FEATURE 4 |
|---|---|---|---|---|---|---|
| 1 | 0000001 | 001 | SUPPORTED | UNSUPPORTED | UNSUPPORTED | UNSUPPORTED |
| 2 | 0000001 | 002 | SUPPORTED | SUPPORTED | UNSUPPORTED | UNSUPPORTED |
| 3 | 0000002 | 001 | SUPPORTED | UNSUPPORTED | SUPPORTED | UNSUPPORTED |
| 4 | 0000003 | 001 | SUPPORTED | SUPPORTED | SUPPORTED | UNSUPPORTED |

THE FOLLOWING CONDITIONS ARE REQUIRED TO USE
THIS FEATURE. SELECT "OK" IF YOU ARE SURE THAT
THE CONDITIONS ARE MET AND "No" IF YOU ARE NOT
SURE. THEN, PRESS "Enter" KEY.
· PLAYER SUPPORTS THIS FEATURE
· DISPLAY SUPPORTS THIS FEATURE
· PLAYER OPTION IS SET TO ALLOW PLAYBACK OK                                    No

COMPUTER IMPLEMENTED METHOD FOR USE IN A PLAY BACK APPARATUS

BACKGROUND

1. Technical Field

The present disclosure relates to a playback control method, a playback apparatus, and a playback system and, in particular, to a playback control method for use in a playback system including a playback apparatus that plays back video and a display apparatus that displays the video played back by the playback apparatus.

2. Description of the Related Art

For a playback system including a playback apparatus, such as a BD player, and a display apparatus, such as a television set, a method for acquiring the features supported by the apparatuses via an HDMI (trade name) has been developed (refer to, for example, Japanese Patent No. 5271532).

SUMMARY

At that time, the information as to whether the apparatuses support, for example, each of mandatory features defined by the standard can be acquired via, for example, HDMI. However, the information as to whether the apparatuses support each of optional features may not be acquired. Thus, video that does not follow the user's intension may be played back.

One non-limiting and exemplary embodiment provides a playback control method, a playback apparatus, or a playback system capable of correctly determining whether the playback system supports an optional feature.

In one general aspect, the techniques disclosed here feature a playback control method for use in a playback system including a playback apparatus that plays back video and a display apparatus that displays the video played back by the playback apparatus is provided. The method includes a first determination step of determining whether the display apparatus supports an optional feature for playback of the video by using a first technique and a second determination step of determining whether the display apparatus supports the optional feature for playback of the video by using a second technique that differs from the first technique if it is indeterminate whether the display apparatus supports the optional feature by using the first technique.

According to the present disclosure, a playback control method, a playback apparatus, or a playback system capable of correctly determining whether the playback system supports an optional feature can be provided.

It should be noted that these general and specific aspects may be implemented as a system, a method, an integrated circuit, a computer program, or a computer-readable recording medium, such as a CD-ROM, or any combination of an apparatus, a system, a method, an integrated circuit, a computer program, and a computer-readable recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart of the server inquiry process according to the first embodiment;

FIG. 6 illustrates an example of feature information according to the first embodiment;

FIG. 9 illustrates an example of feature information according to a modification of the first embodiment;

FIG. 13 illustrates an example of a confirmation screen for a user according to the second embodiment;

DETAILED DESCRIPTION

Figure 1:
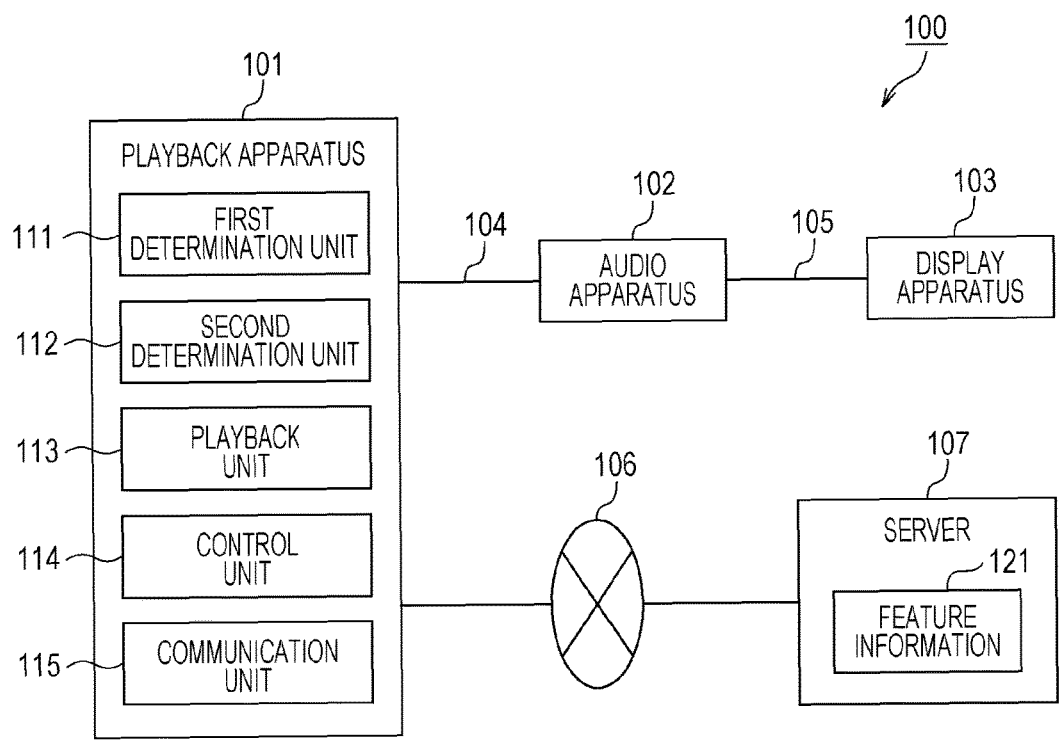
FIG. 1 illustrates the configuration of a playback system according to a first embodiment.

Underlying Knowledge Forming Basis of the Present Disclosure

The present inventor discovered that the following issues arise in the playback control method described in Section "2. Description of the Related Art".

Each of the apparatuses (e.g., a player, a display, and an AV amplifier) can acquire, from each of the other apparatuses, the information as to whether the apparatus supports each of the mandatory features defined by the standard via, for example, HDMI. However, in some cases, the apparatus cannot acquire such information regarding optional features.

In addition, to determine whether an optional feature can be executed in a playback system including the plurality of apparatuses, the user needs to understand the settings of each of the apparatuses and the connection relationship among the apparatuses in addition to the features of the apparatus. However, it is difficult for the user to correctly understand the variety of settings from, for example, the manuals.

Furthermore, even when these settings are not correctly configured, video may be played back. That is, even when the system does not support an optional feature, video may be ordinarily played back without using the optional feature. In such a case, the user cannot easily recognize whether the video currently played back is a video that reflects the optional feature. Thus, the user may mis-recognize that the video currently played back is a video that reflects the optional feature. In this manner, the user may underestimate the optional feature.

For example, a problem may arise in playback with an optional feature in the following cases.

(1) A playback apparatus (a player or a recorder) can output video data (or audio data) corresponding to the optional feature. However, the playback apparatus does not have a feature to examine that video data corresponding to the optional feature is being output. For example, the optional feature is an extension of some mandatory feature.

(2) Although the display apparatus (a TV set or a display) can receive video data corresponding to the optional feature, the display apparatus cannot recognize that it is receiving video data corresponding to the optional feature. For example, although the display apparatus supports the optional feature and can receive the data using an external input I/F, such as HDMI, the display apparatus cannot recognize that data corresponding to the optional feature is being input, since the optional feature is not defined.

(3) When the output data from a playback apparatus passes through a device, such as an AV amplifier or a selector, such a relay device does not support a flag indicating the optional feature.

(4) Data corresponding to the optional feature is converted into another format due to the settings of the playback apparatus. In particular, if a relationship between the data and the optional feature is unclear, it is difficult for the user to recognize what is happening. For example, it is difficult for the user to recognize what is happening when the data is converted into one of the mandatory features, when a 3D video is converted into a 2D video, or when surround sound is converted into stereo sound.

Thus, the present disclosure describes a playback control method, a playback apparatus, or a playback system capable of correctly recognizing whether the playback system supports an optional feature.

According to an aspect of the present disclosure, a playback control method for use in a playback system including a playback apparatus that plays back video and a display apparatus that displays the video played back by the playback apparatus is provided. The method includes a first determination step of determining whether the display apparatus supports an optional feature for playback of the video by using a first technique and a second determination step of determining whether the display apparatus supports the optional feature for playback of the video by using a second technique that differs from the first technique if it is indeterminate whether the display apparatus supports the optional feature by using the first technique.

In this manner, the playback control method determines whether each of the apparatuses supports the optional feature by using the second technique if the playback control method cannot determine whether the apparatus supports the optional feature by using the first technique. Accordingly, it can be more correctly determined whether the playback system supports, for example, the optional feature.

For example, in the first technique, it may be determined whether the display apparatus supports the optional feature on the basis of information held by the display apparatus. In the second technique, information asking a user whether the display apparatus supports the optional feature may be output.

In this manner, according to the playback control method, if it is indeterminate whether each of the apparatuses supports the optional feature when the first technique is employed, the user is asked whether the apparatus supports the optional feature. Accordingly, it can be more correctly determined whether the playback system supports, for example, the optional feature.

For example, in the second technique, test content used by the user to determine whether the display apparatus supports the optional feature may be played back.

In this manner, by using the test content, even a user who is not used to setting up the apparatus can easily determine whether the optional feature is executable. Accordingly, it can be more correctly determined whether the playback system supports, for example, the optional feature.

For example, in the first technique, it may be determined whether the display apparatus supports the optional feature on the basis of information held by the display apparatus. In the second technique, it may be determined whether the display apparatus supports the optional feature on the basis of information held by a server connected to the playback apparatus via a network.

In this manner, according to the playback control method, if it is indeterminate whether each of the display apparatuses supports the optional feature when the first technique is employed, the server is asked whether the apparatus supports the optional feature. Accordingly, it can be more correctly determined whether the playback system supports, for example, an optional feature.

According to another aspect of the present disclosure, a playback apparatus for playing back video is provided. The apparatus includes a first determination unit that determines whether a display apparatus that displays the video played back by the playback apparatus supports an optional feature for playback of the video by using a first technique and a second determination unit that determines whether the display apparatus supports the optional feature by using a second technique that differs from the first technique if it is indeterminate whether the display apparatus supports the optional feature by using the first technique.

In this manner, if the playback apparatus cannot determine whether each of the apparatuses supports the optional feature by using the first technique, the playback apparatus determines whether each of the apparatuses supports the optional feature by using the second technique. Accordingly, it can be more correctly determined whether the playback system supports, for example, an optional feature.

For example, according to another aspect of the present disclosure, a playback system including a playback apparatus that plays back video and a display apparatus that displays the video played back by the playback apparatus is provided. The system includes a first determination unit that determines whether a display apparatus that displays the video played back by the playback apparatus supports an optional feature for playback of the video by using a first technique and a second determination unit that determines whether the display apparatus supports the optional feature by using a second technique that differs from the first technique if it is indeterminate whether the display apparatus supports the optional feature by using the first technique.

In this manner, the playback system determines whether each of the display apparatuses supports the optional feature by using the second technique if it is indeterminate whether the display apparatus supports the optional feature by using the first technique. Accordingly, it can be correctly determined whether the playback system supports, for example, an optional feature.

It should be noted that these general and specific aspects may be implemented as a system, a method, an integrated circuit, a computer program, or a computer-readable recording medium, such as a CD-ROM, or any combination of an apparatus, a system, a method, an integrated circuit, a computer program, and a computer-readable recording medium.

Embodiments of the present disclosure are described below with reference to the accompanying drawings. Note that each of the embodiments described below is a preferred embodiment of the present disclosure. That is, a value, a shape, a material, a constituent element, the positions and the connection form of the constituent elements, steps, and the sequence of steps described in the embodiments below are only examples and shall not be construed as limiting the scope of the present disclosure. In addition, among the constituent elements in the embodiments described below, the constituent element that does not appear in an independent claim, which has the broadest scope, is described as an element that constitutes a more preferable embodiment.

First Embodiment

In a playback system according to the present embodiment, if a playback apparatus cannot determine via, for example, HDMI whether each of the apparatuses supports the optional feature, the playback apparatus sends an inquiry to a server via a network. In this manner, the playback apparatus can recognize whether the playback system supports the optional feature more correctly.

The configuration of the playback system according to the present embodiment is described first. FIG. 1 illustrates the configuration of a playback system 100 according to the present embodiment. The playback system 100 includes a playback apparatus 101, an audio apparatus 102, a display apparatus 103, and a server 107.

The playback apparatus 101, the audio apparatus 102, and the display apparatus 103 are set in, for example, some house. In addition, the audio apparatus 102 and the display apparatus 103 are connected to the playback apparatus 101 via HDMI cables 104 and 105, respectively. Note that although in this example, the display apparatus 103 is connected to the playback apparatus 101 via the audio apparatus 102, the display apparatus 103 may be directly connected to the playback apparatus 101. In addition, the audio apparatus 102 is not always included in the playback system 100, and another apparatus may be included in the playback system 100. Furthermore, the apparatuses need not be always connected to each other using an HDMI cable. Any interface that allows one apparatus to recognize the features of the other apparatus can be employed.

Examples of the playback apparatus 101 include but not limited to a BD player and a BD recorder. The playback apparatus 101 plays back video stored in a recording medium (e.g., a BD), a video stored therein, or a video acquired through broadcasting or a network.

An example of the audio apparatus 102 is an AV amplifier. The audio apparatus 102 outputs sound output from the playback apparatus 101. An example of the display apparatus 103 is a television set or a display. The display apparatus 103 displays a video played back by the playback apparatus 101.

The server 107 is connected to the playback apparatus 101 via a network 106. Note that typically, the server 107 is an outside server connected to the playback apparatus 101 via, for example, the Internet. However, the server 107 may be a home server.

The playback apparatus 101 includes a first determination unit 111, a second determination unit 112, a playback unit 113, a control unit 114, and a communication unit 115.

The first determination unit 111 determines whether each of the apparatuses (the playback apparatus 101, the audio apparatus 102, and the display apparatus 103) supports an optional feature for video playback by using a first technique.

If it cannot be determined whether each of the apparatuses supports the optional feature by using the first technique, the second determination unit 112 determines whether each of the apparatuses or the playback system 100 supports the optional feature by using a second technique that differs from the first technique.

The playback unit 113 plays back a video. The communication unit 115 communicates with the server 107 via the network 106. The control unit 114 controls, for example, the playback unit 113 and the communication unit 115.

Figure 2:
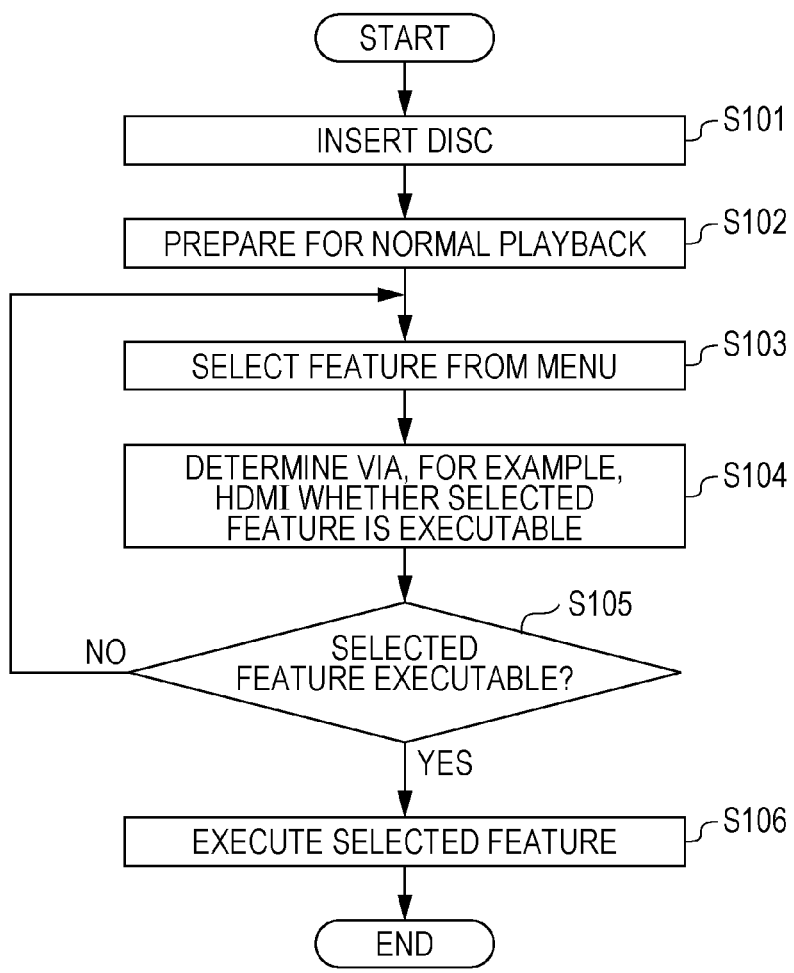
FIG. 2 is a flowchart of the operation performed during playback with a normal feature according to the first embodiment.

The operation performed by the playback system 100 is described below. The operation performed by the playback system 100 when a normal feature is used is described first. FIG. 2 is a flowchart of the operation performed by the playback system 100 when a normal feature is used.

As used herein, the term "normal feature" refers to a mandatory feature defined by, for example, a video standard. For example, a normal feature is a feature that allows the information as to whether each of the apparatuses supports the feature to be acquired via HDMI.

The user inserts, for example, a BD disc into the playback apparatus 101 first (S101). Subsequently, the playback apparatus 101 prepares normal playback (S102). Thereafter, the playback apparatus 101 displays a menu screen and receives a menu selection operation performed by the user (S103).

Subsequently, the playback apparatus 101 determines whether the playback system 100 can execute the selected feature (S104). More specifically, the first determination unit 111 determines whether the playback apparatus 101 supports the feature on the basis of the information held by the playback apparatus 101. Still more specifically, if a capability bit corresponding to the feature is defined, the first determination unit 111 refers to a corresponding bit held by the playback apparatus 101 to determine whether the playback apparatus 101 is capable of executing the feature. Alternatively, by examining a combination of a plurality of capability bits held by the playback apparatus 101, the first determination unit 111 determines whether the playback apparatus 101 is capable of performing the feature. Still alternatively, by examining whether the setting of the feature is not the setting unusable for the playback apparatus 101, the first determination unit 111 determines whether the playback apparatus 101 is capable of executing the feature.

In addition, the first determination unit 111 determines, via, for example, HDMI, whether the audio apparatus 102 and the display apparatus 103 support the feature on the basis of the information held by the audio apparatus 102 and the display apparatus 103. More specifically, by examining the capability flag of HDMI of each of the apparatuses, the first determination unit 111 determines whether each of the apparatuses supports the feature.

If all the apparatuses support the feature, the playback apparatus 101 determines that the feature can be executed (YES in S105) and, thus, executes the feature (S106). However, if any one of the apparatuses does not support the feature, the playback apparatus 101 determines that the feature cannot be executed (NO in S105) and, thereafter, the processing returns to S103.

Note that in the above description, the processing returns to step S103 if the selected feature is not executable (NO in S105). However, at that time, the playback may be stopped (terminated). In addition, after the process in step S106 is completed, the processing may return to step S103 instead of being completed.

Figure 3:
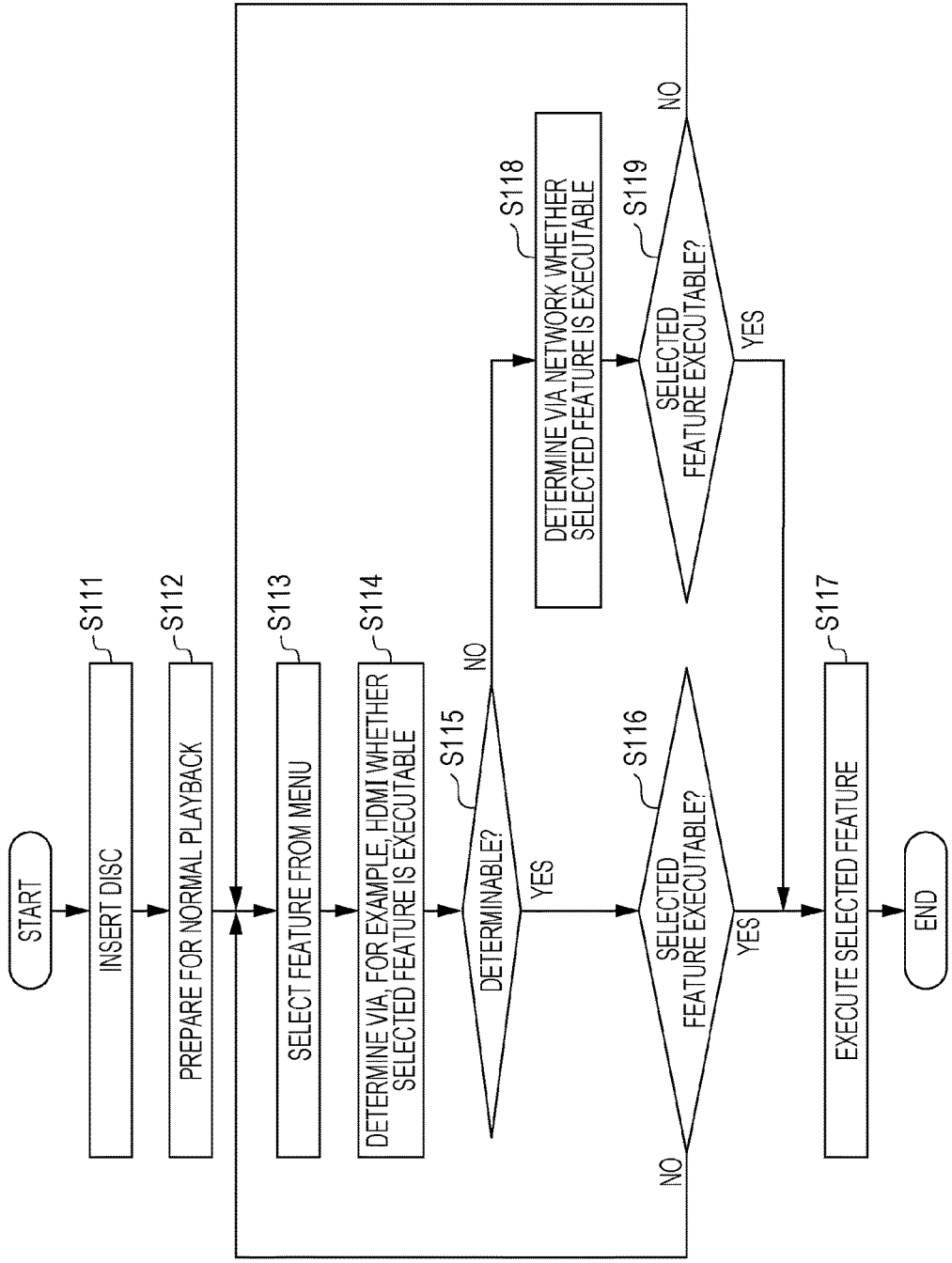
FIG. 3 is a flowchart of the operation performed during playback with an optional feature according to the first embodiment.

The operation performed by the playback system 100 when the optional feature is used is described next. FIG. 3 is a flowchart of the operation performed by the playback system 100 when the optional feature is used.

As used herein, the term "optional feature" refers to an extended feature which is not necessarily defined by, for example, the video standard. For example, optional features are features for which the information as to whether each of the apparatuses supports the features is not always acquired via HDMI. More specifically, examples of the optional feature include a 3D video display feature and an HDR (high dynamic range video) feature of the video feature.

In addition, an optional feature is an extended feature of audio codec. For example, examples of such an optional feature include a channel extension (extension from two channels to surround or extension from 5.1 ch to 6.1 or 7.1 ch), sampling frequency/quantifying bit number extension (extension from 48 KHz to 96 or 192 KHz or extension from 16 bits to 20 or 24 bits), a new method (e.g., object coding), and a new codec (e.g., lossless).

The user inserts, for example, a BD disc into the playback apparatus 101 first (S111). Subsequently, the playback apparatus 101 prepares normal playback (S112). Thereafter, the playback apparatus 101 displays a menu screen and receives a menu selection operation performed by the user (S113).

Subsequently, the playback apparatus 101 determines whether the playback system 100 can execute the selected feature (S114). Note that the details of the process is the same as that in step S104 described above.

Subsequently, the playback apparatus 101 determines whether, in step S114, it has been determined that the selected feature is executable (step S115).

If it can be determined that the selected feature is executable (YES in step S115), the process that is the same as in FIG. 2 is performed. That is, if all the apparatuses support the feature, the playback apparatus 101 determines that the feature is executable (YES in S116) and, thus, executes the feature (S117). However, if any one of the apparatuses does not support the feature, the playback apparatus 101 determines that the feature is not executable (NO in S116) and, thereafter, the processing returns to step S113.

However, if it is indeterminate whether the selected feature is executable (NO in step S115), the second determination unit 112 sends an inquiry to the server 107 via the network 106. In this manner, it is determined whether the playback system 100 can execute the selected feature (S118).

Note that when a plurality of apparatuses are present in the playback system 100 and if it cannot be determined whether at least one of the apparatuses supports the selected feature, the process in step S118 is performed. Alternatively, when an apparatus for which it cannot be determined whether the apparatus supports the selected feature is present and if all the other apparatuses support the selected feature, the process in step S118 may be performed.

Subsequently, if, in step S118, the playback apparatus 101 determines that the selected feature is executable (YES in step S119), the playback apparatus 101 executes the selected feature (S117). However, if, in step S118, the playback apparatus 101 determines that the selected feature is not executable (NO in step S119), the processing returns to step S113.

While the above description has been given with reference to two process flows, that is, the flow in the case where a normal feature is selected and the flow in the case where an optional feature is selected, the process is not limited thereto. The process illustrated in FIG. 3 may be performed regardless of the cases where a normal feature is selected and an optional feature is selected. Note that if a normal function is selected, the determination is always YES in step S115 and, thus, the process is the same as in FIG. 2.

A method for determining whether a selected feature is executable by sending an inquiry to the server 107 (S118) is described in detail below.

Figure 4:
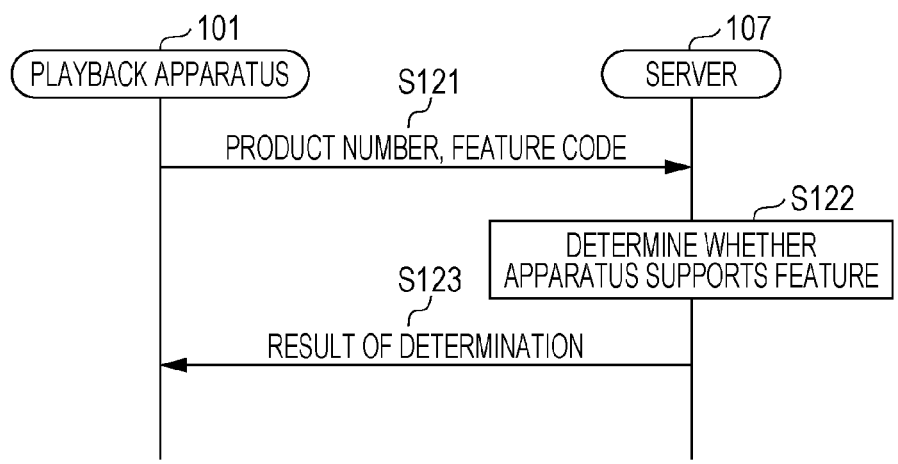
FIG. 4 is a sequence diagram of a server inquiry process according to the first embodiment.

FIG. 4 illustrates the flow of the determination method using the server 107. The playback apparatus 101 sends, to the server 107, the product number of an apparatus for which it cannot be determined whether the apparatus supports the selected feature in step S114 and the feature code of the selected feature first (S121). Note that in this example, the product number and the feature code are used. However, any other information that identifies the product type of the apparatus (the type) and the selected feature may be used.

The server 107 determines whether the apparatus identified by the product number supports the feature identified by the feature code (S122). Thereafter, the server 107 sends the result of determination to the playback apparatus 101 (S123).

Note that if, in step S114, there are a plurality of apparatuses for which it is indeterminate whether they support the selected feature, the above-described process may be performed for each of the apparatuses, or the information regarding the plurality of apparatuses may be collectively sent to the server 107.

FIG. 5 is a flowchart of the process performed by the server 107 in the above-described process. FIG. 6 illustrates an example of feature information 121 stored in the server 107.

As illustrated in FIG. 6, the feature information 121 indicates the supported features for each of the manufacturers for each of the product numbers. Note that the feature information 121 illustrated in FIG. 6 is generated on the basis of the information generated by the manufacturers or the information generated by the user. For each of the information items based on the information generated by the manufacturer and the information items generated by the user and confirmed by the manufacturer, the entry "Confirmation" is set to "ON". That is, an information item having the entry "Confirmation" set to "ON" is more reliable than an information item having the entry "Confirmation" set to "OFF".

In addition, another table indicating the details of the feature supported by the apparatus of each of the product numbers may be provided, and the detailed feature may be written in the table. For example, the table includes the information indicating which part of written standards describes each of the features or the license name of a company that licenses the feature. The details set forth in the table need to be determined by the database management company, the manufacturer, or the licensing company.

Furthermore, since it is difficult to change the already registered feature in order to maintain the compatibility, an additional entry is provided when, for example, the feature is enhanced. For example, when a feature A is updated to a feature A', information indicating that the apparatus or the system that supports the feature A' also supports the feature A is stored for the apparatus or the system.

The server 107 receives, from the playback apparatus 101, the product number of the apparatus (including the information indicating the manufacturer) first (S131). Subsequently, the server 107 determines whether the received product number is present in the database (the feature information 121) (S132).

If the received product number is present in the database (YES in S132), the server 107 requests the playback apparatus 101 to send back the feature code (S133) and receives the feature code from the playback apparatus 101 (S134). Thereafter, the server 107 determines whether the feature corresponding to the received feature code is present in the database (the feature information 121) (S135).

If the feature corresponding to the received feature code is present in the database (YES in S135), the server 107 refers to the feature information 121 and determines whether an apparatus of the received product number supports the feature of the received feature code (S136). Thereafter, the server 107 sends the result of determination to the playback apparatus 101 (S137).

However, if the received product number or the received feature code is not present in the database (NO in S132, or NO in S135), the server 107 sends, to the playback apparatus 101, a message indicating that the determination is unavailable (S138).

Note that to make the above-described determination, only the information items having "ON" in the "confirmation" entry may be used. Alternatively, both the information items having "ON" in the "confirmation" entry and the information items having "OFF" in the "confirmation" entry may be used. In addition, when both the information items having "ON" in the "confirmation" entry and the information items having "OFF" in the "confirmation" entry are used, a message indicating that the determination is made using the "OFF" information or a message indicating that the determination is likely to have low reliability may be sent to the user.

In this manner, the user can recognize that the determination is highly reliable if a confirmation mark is "ON". In addition, since the playback apparatus 101 and the server 107 can refer to the information other than the information having a confirmation mark of "ON", the playback apparatus 101 can refer to the information regarding even a new product or an obsolete product or even when registration by the manufacturer is late.

As described above, the playback apparatus 101 can acquire, from the server 107, the information indicating whether each of the apparatuses supports the selected feature.

Figure 7:
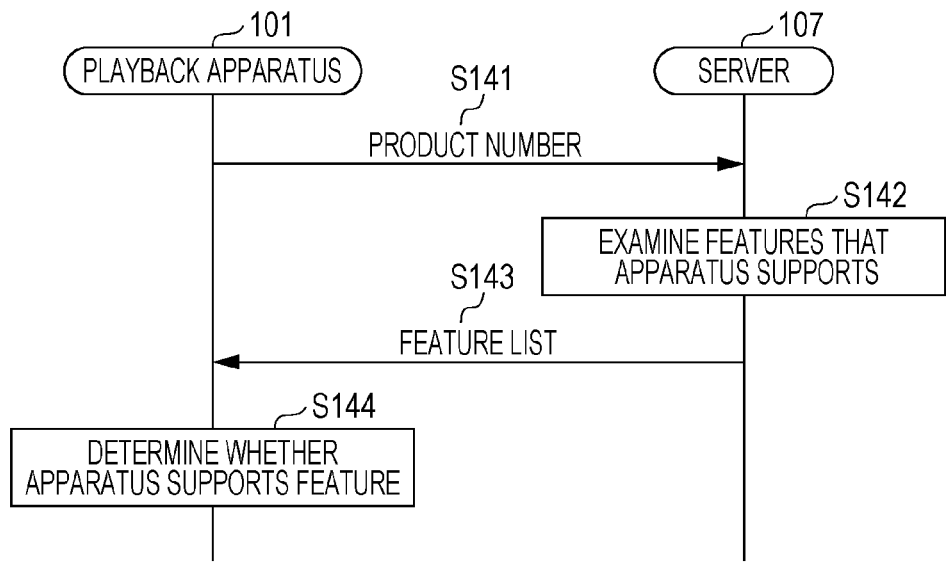
FIG. 7 is a sequence diagram of a modification of the server inquiry process according to the first embodiment.
Figure 8:
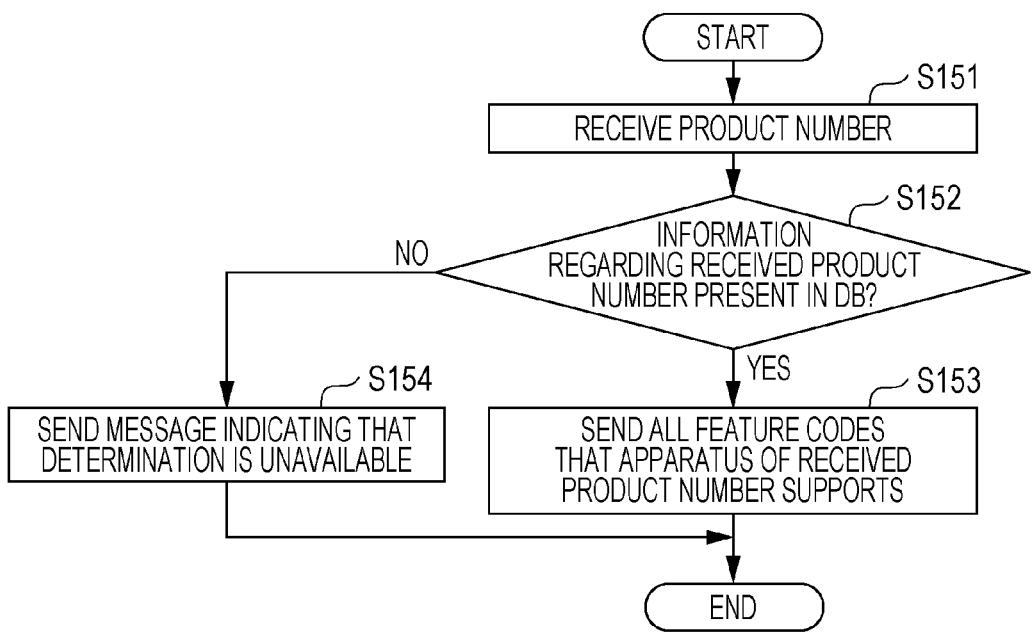
FIG. 8 is a flowchart of a server inquiry process according to a modification of the first embodiment.

Note that instead of the above-described process, the following process may be performed. FIG. 7 illustrates the flow of the determination method using the server 107 according to a modification. FIG. 8 is a flowchart of the process performed by the server 107 in this case.

In this example, the playback apparatus 101 sends the product number to the server 107 (S141). The server 107 examines the features that the apparatus identified by the product number supports (S142) and sends, to the playback apparatus 101, a feature list, which is a list of the features that the apparatus supports (S143). The playback apparatus 101 determines whether the apparatus supports the selected feature using the received feature list (S144).

In addition, as illustrated in FIG. 8, the server 107 receives, from the playback apparatus 101, the product number of the apparatus (including the information regarding the manufacturer) (S151). Thereafter, the server 107 determines whether the received product number is present in the database (the feature information 121) (S152).

If the received product number is present in the database (YES in S152), the server 107 refers to the feature information 121 and sends, to the playback apparatus 101, the feature list indicating all the features that the apparatus of the received product number supports (S153). Note that the feature list may be information indicating whether the apparatus supports each of all the features included in the feature information 121.

However, if the received product number is not present in the database (NO in S152), the server 107 sends, to the playback apparatus 101, a message indicating that the determination is unavailable (S154).

In addition, the information indicating whether the playback system owned by the user can execute each of the features may be pre-registered in the server 107. FIG. 9 illustrates an example of feature information 121A stored in the server 107 in such a case.

The feature information 121A indicates the features that a system supports for each of pairs consisting of a user ID for uniquely identifying a user and a system ID for uniquely identifying the system owned by the user. Note that in this example, the user owns a plurality of systems, and the user ID and the system ID are used. However, any information that identifies the system the user owns can be used. Thus, the form of processing is not limited to the above-described form.

In addition, the feature information 121A is pre-registered in the server 107 by the user via the playback apparatus 101. For example, the user pre-registers, in the server 107, the user ID, the system ID, and the features supported by the system. Alternatively, the user may pre-register, in the server 107, the user ID, the system ID, and the information regarding a plurality of apparatuses included in the system (e.g., the product numbers). Thereafter, for example, the server 107 may determine the features that the system supports using the feature information 121 illustrated in FIG. 6 and generate the feature information 121A.

Alternatively, the feature information 121A may be generated by using the past history information. For example, if the target feature has been used in the system in the past, it may be determined that the system can execute the target feature.

More specifically, a test may be scheduled in advance. For example, when the power is turned on, it is determined whether an optional feature is executable. The result of determination is stored in the server 107. This determination may be made by the user or may be automatically made. Alternatively, the playback apparatus 101 may be connected to the server 107 via the BD-J and examine the operation.

Alternatively, as a method for the user to determine whether the system supports the target feature, a method according to a second embodiment (described below) may be employed. Still alternatively, a combination of the above-described methods may be employed.

Figure 10:
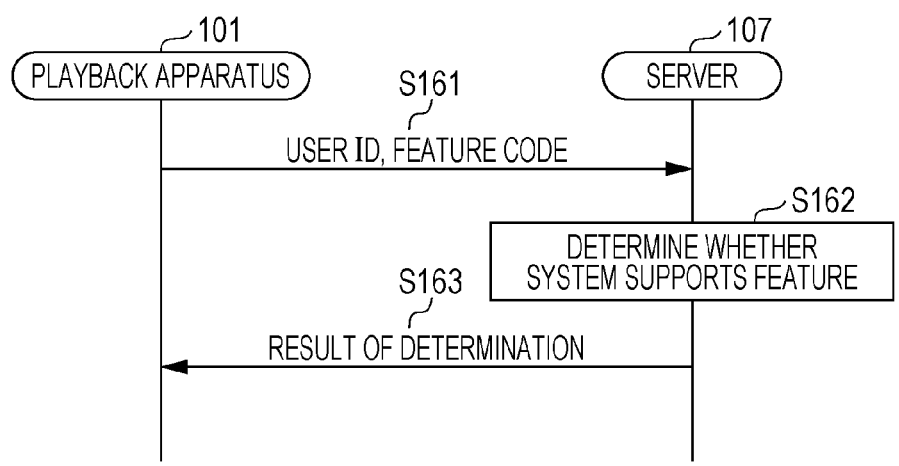
FIG. 10 is a sequence diagram of a server inquiry process according to a modification of the first embodiment.
Figure 11:
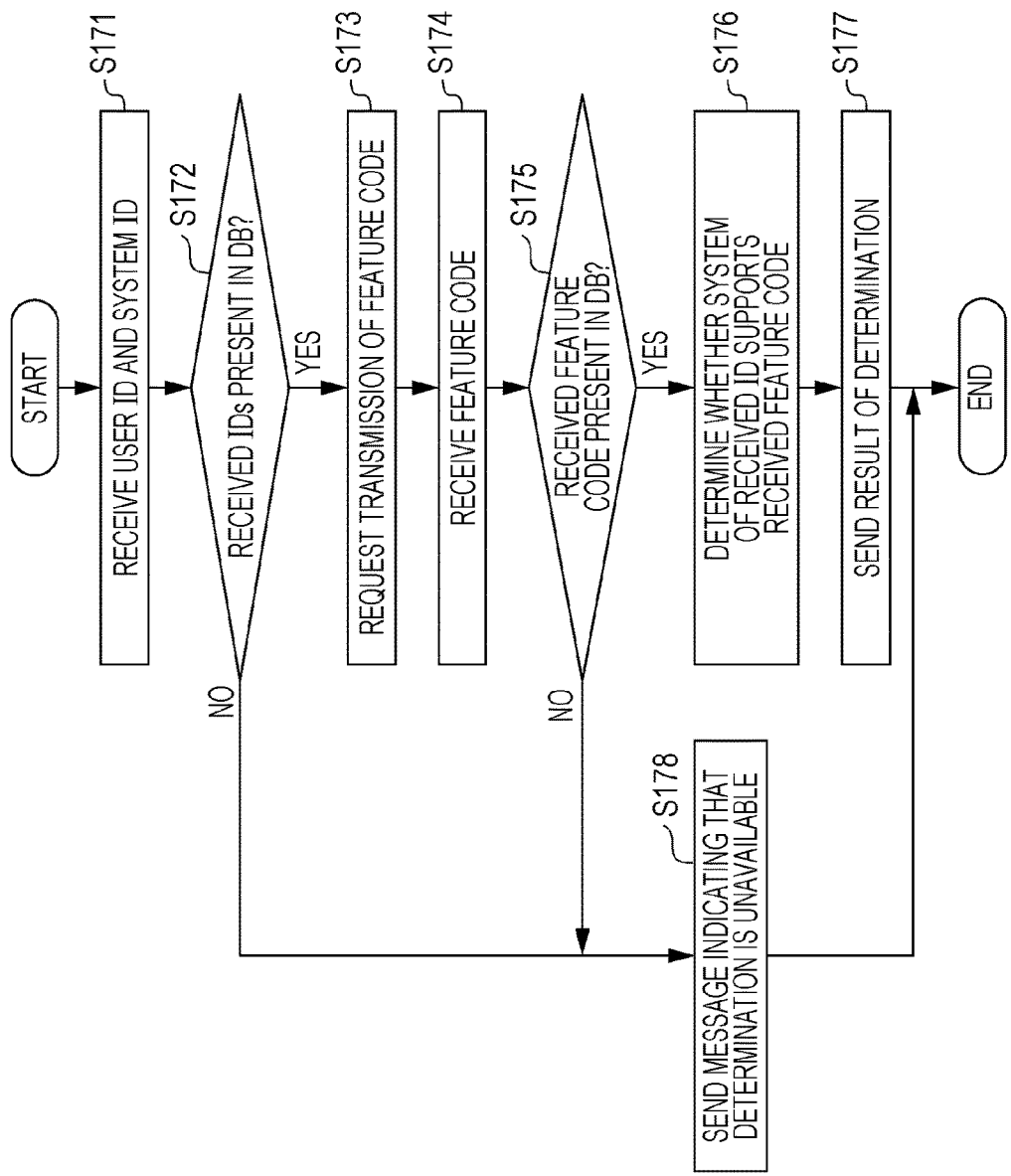
FIG. 11 is a flowchart of the server inquiry process according to the modification of the first embodiment.

FIG. 10 illustrates the flow of the determination method using the server 107 according to a modification. FIG. 11 is a flowchart of the process performed by the server 107 in such a case.

In this example, the playback apparatus 101 sends the user ID, the system ID, and the feature code to the server 107 (S161). The server 107 determines whether the system identified by the user ID and the system ID supports the feature identified by the feature code (S162) and sends the result of determination to the playback apparatus 101 (S163).

In addition, as illustrated in FIG. 11, the server 107 receives, from the playback apparatus 101, the user ID and the system ID first (S171). Subsequently, the server 107 determines whether the received user ID and system ID are present in the database (the feature information 121A) (S172).

If the received user ID and system ID are present in the database (YES in S172), the server 107 requests the playback apparatus 101 to send back the feature code (S173) and receives the feature code from the playback apparatus 101 (S174). Thereafter, the server 107 determines whether the feature corresponding to the received feature code is present in the database (the feature information 121A) (S175).

If the feature corresponding to the received feature code is present in the database (YES in S175), the server 107 refers to the feature information 121A and determines whether the system of the received user ID and system ID supports the feature of the received feature code (S176). Thereafter, the server 107 sends the result of determination to the playback apparatus 101 (S177).

However, if the pair consisting of the received user ID and system ID or the feature code is not present in the database (NO in S172, or NO in S175), the server 107 sends, to the playback apparatus 101, a message indicating that the determination is unavailable (S178).

As described above, if the playback system 100 according to the present embodiment cannot determine that each of the each of the apparatuses supports an optional feature by using, for example, HDMI, the playback system 100 sends an inquiry to the server 107. In this manner, the playback apparatus can determine whether the playback system 100 supports the optional feature more correctly.

In addition, as described above, examples of the optional feature include a 3D video display feature, an HDR feature, and an extended feature of audio codec.

Even when the 3D video display feature is not supported, the user may be able to watch the video if the video is displayed line by line or side by side or only one-side frames of a frame sequential video is displayed. Accordingly, if the playback system 100 cannot determine via HDMI whether a 3D video is supported, it is desirable to allow the user to watch the video by appropriately configuring the settings of the display apparatus 103. This determination can be automatically made by the display apparatus 103 on the basis of the content of the input video. However, the display apparatus 103 may make a wrong determination depending on the content of a video. In contrast, by using the method according to the present embodiment, it can be correctly determined whether each of the apparatuses supports 3D video display. Accordingly, the above-described operations can be more correctly performed.

In addition, in terms of HDR, a variety of video format standards have compatibility, in general. Thus, even an apparatus that does not support HDR may receive an HDR signal and display the video with a wrong HDR signal. If only a standard video format is employed, each of the apparatuses can determine via HDMI whether an apparatus supports HDR. However, if the optional feature or a proprietary extension feature is employed, such determination is unavailable. Accordingly, in such a case, the method according to the present embodiment is effective.

In addition, in terms of audio codec, information regarding basic codec is sent via HDMI and, thus, each of the apparatuses can determine which feature an apparatus supports. However, nowadays, a variety of extensions of the audio codec are developed. Thus, in many cases, it cannot be determined whether a signal has an extension feature until a decoder on the output side decodes the signal. In addition, in many cases, audio codec is converted on the playback side. Thus, it is difficult to determine whether the apparatuses are correctly connected to each other to play back a video and whether the video is correctly being played back. Accordingly, in such a case, the method according to the present embodiment is also effective.

Second Embodiment

According to the present embodiment, if it cannot be determined via, for example, HDMI whether each of the apparatuses supports an optional feature, an inquiry is sent to the user. Note that in the description below, the differences between the second embodiment and the first embodiment are mainly described.

Figure 12:
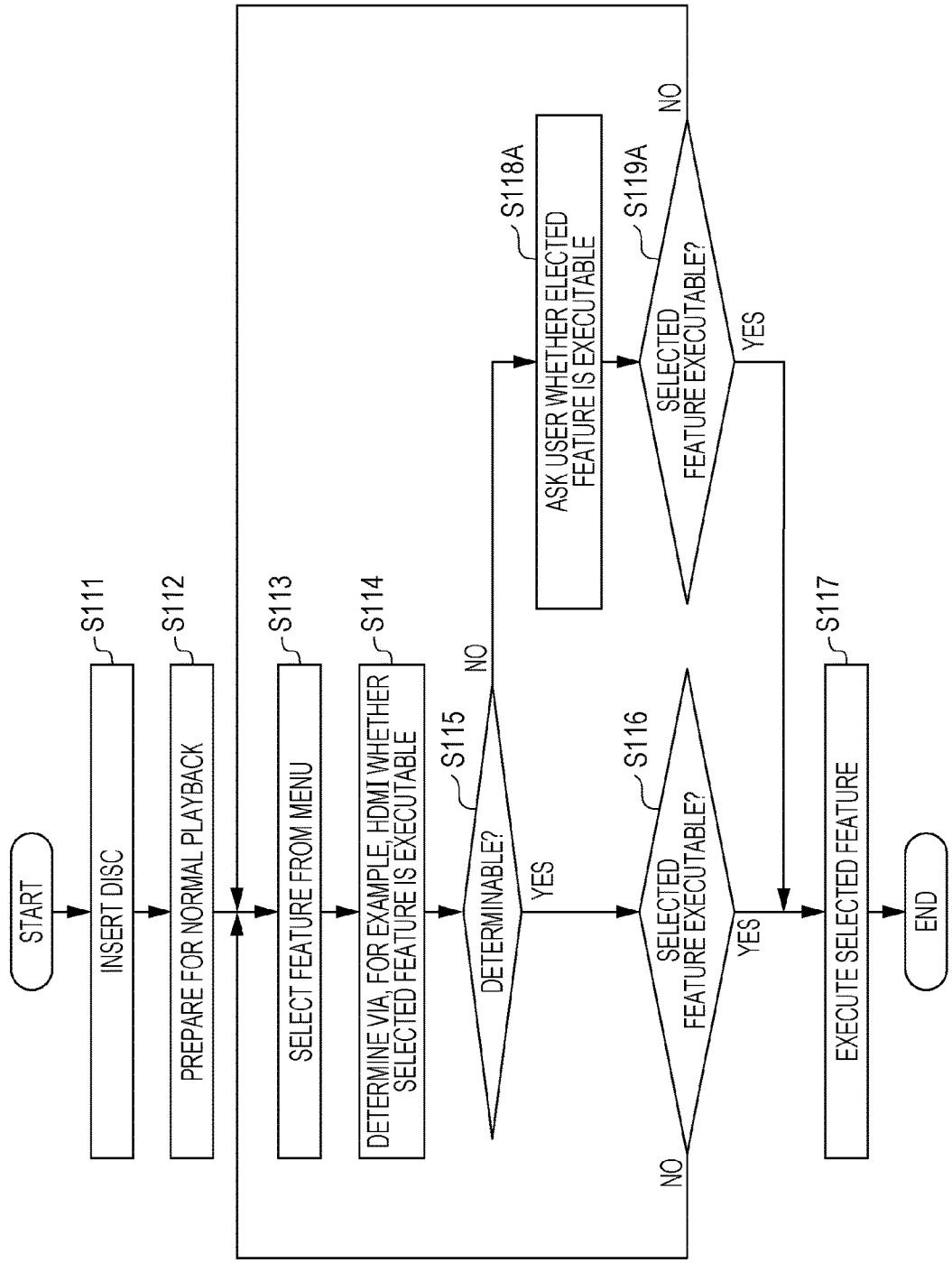
FIG. 12 is a flowchart of the operation performed during playback with an optional feature according to a second embodiment.

FIG. 12 is a flowchart of the operation performed by a playback system 100 according to the present embodiment. Note that the process illustrated in FIG. 12 differs from the process illustrated in FIG. 3 in that steps S118 and S119 are changed to steps S118A and S119A, respectively.

If, in step S114, it cannot be determined whether the selected feature is executable (NO in S115), the second determination unit 112 sends an inquiry to the user and determines whether the selected feature is executable (S118A). For example, the second determination unit 112 displays a confirmation screen for the user and receives the result of confirmation input from the user.

FIG. 13 illustrates an example of a confirmation screen 201 for the user. As illustrated in FIG. 13, a message indicating that the settings to enable the optional feature are needed is sent to the user and, in addition, points to be confirmed are presented to the user. More specifically, a requirement for an external apparatus (e.g., the display apparatus 103) and a requirement for the playback apparatus 101 are displayed. Note that a requirement for connection among the apparatuses may be displayed. In addition, confirmation whether an optional feature is used is made using the screen 201.

In addition, as illustrated in FIG. 12, if, in step S118A, the information indicating that the selected feature is executable is input by the user (YES in S119A), the selected feature is executed (S117). Otherwise (NO in S119A), the processing returns to step S113.

Figure 14:
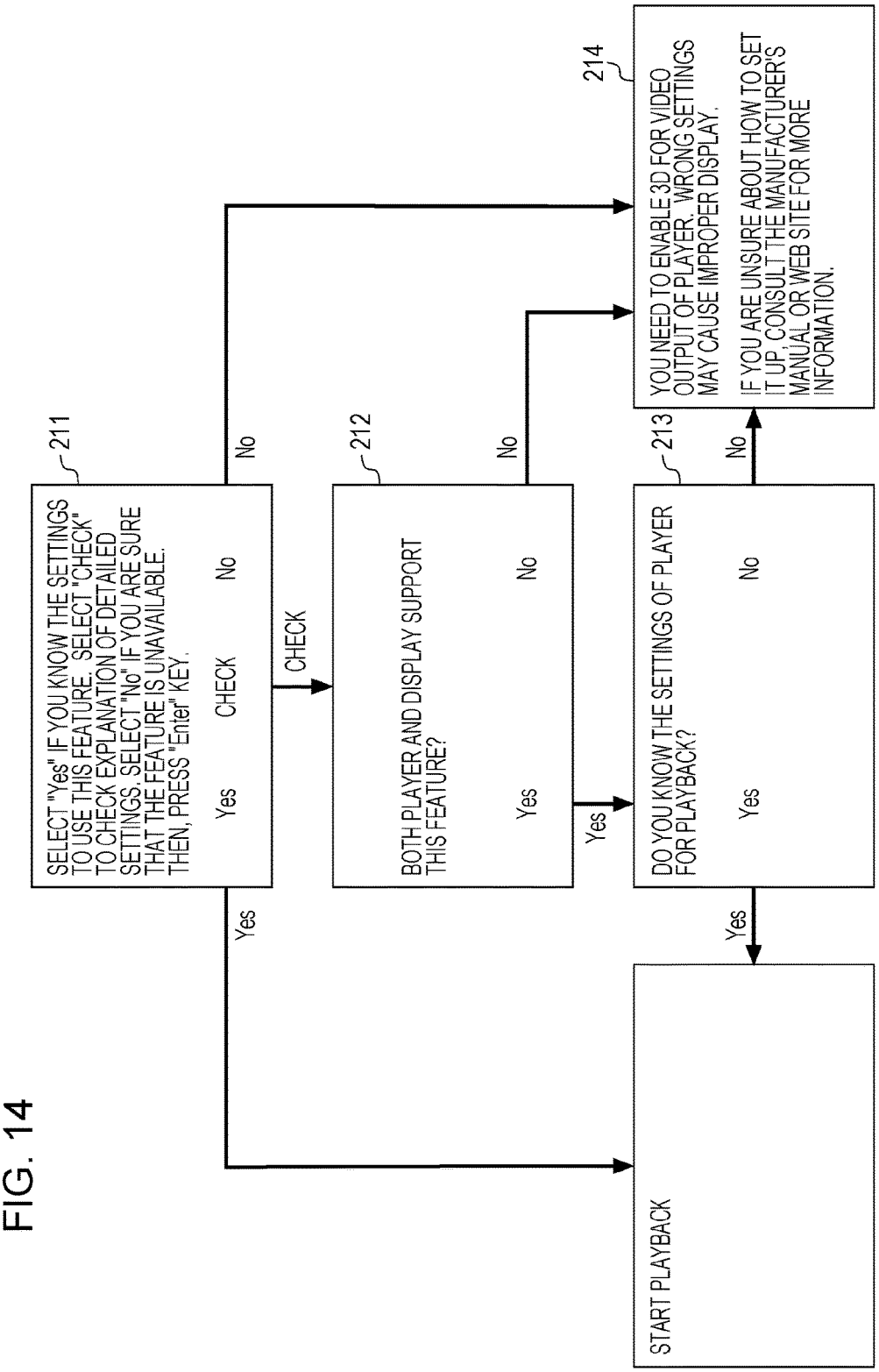
FIG. 14 illustrates an example of a confirmation screen for a user according to a modification of the second embodiment.

In addition, FIG. 14 illustrates another example of a confirmation screen. As indicated by a screen 211 illustrated in FIG. 14, the user is asked whether or not the selected feature is executable and, in addition, whether or not the user needs detailed explanation. If "Check" is selected in the screen 211, a message for checking the feature and the settings of each of the apparatuses to execute the selected feature and a message for checking user's level of understanding of the apparatuses or the system are displayed to the user, as indicated by screens 212 and 213.

In contrast, if "No" is selected in any one of the screens 211, the screen 212, and the screen 213, the settings required for executing the selected feature and description on what is happening if wrong settings are configured are displayed, as indicated by a screen 214. In addition, the information that helps the user to configure the above-described settings is displayed in the screen 214.

In contrast, if the user explicitly allows playback (the user selects "YES" in the screen 211) or if user's level of understanding is sufficient (the user selects "YES" in the screen 213), playback of the video using the optional feature is started.

Figure 15:
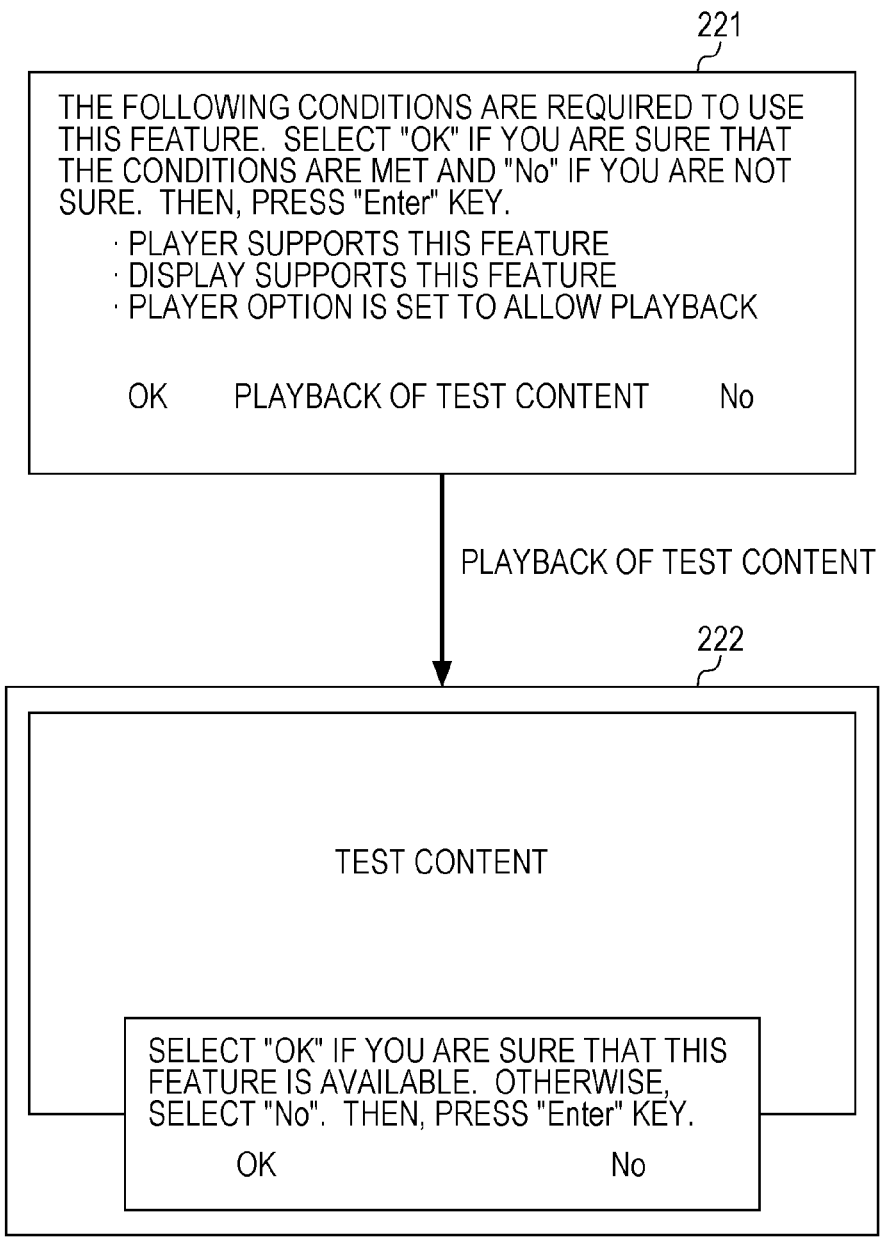
FIG. 15 illustrates an example of a confirmation screen for a user according to a modification of the second embodiment.

FIG. 15 illustrates another example of the confirmation screen. A menu for playing back test content is displayed in a screen 221 illustrated in FIG. 15, if the user selects "Playback of Test Content" in the screen 221, the playback apparatus 101 starts playing back the test content, as illustrated in the screen 222.

Note that the test content is used for the user to determine whether the selected feature is executed. For example, content having an image and sound that significantly change in accordance with whether the selected feature is enabled or not is used as the test content. Also note that the test content may include at least one of information indicating what image is displayed (or what sound is output) if the selected feature is enabled and information indicating what image is displayed (or what sound is output) if the selected feature is disabled.

For example, in terms of surround sound, sound is output from only a particular speaker, and the information indicating the speaker that is outputting the sound is displayed.

In addition, as illustrated in FIG. 15, a menu for asking the user whether the selected feature is executable may be displayed when playback of the test content starts. Note that this menu may be displayed after the test content is played back or in accordance with the operation performed by the user.

As described above, in the playback system 100 according to the present embodiment, if it cannot be determined via, for example, HDMI whether the each of the apparatuses supports an optional feature, it can be determined whether the playback system 100 supports the optional feature by sending an inquiry to the user. In this manner, it can be more correctly determined whether the playback system 100 supports the optional feature.

Note that while the above first embodiment and second embodiment have been described with reference to the method for sending an inquiry to the server 107 and the method for sending an inquiry to the user, respectively, the methods may be combined. For example, if an inquiry is sent to the server 107 and the result of determination cannot be obtained, the inquiry may be sent to the user. In addition, the result of the inquiry returned from the user may be stored in the server 107 as the feature information 121A, or the feature information 121A may be generated using the result of the inquiry.

Figure 16:
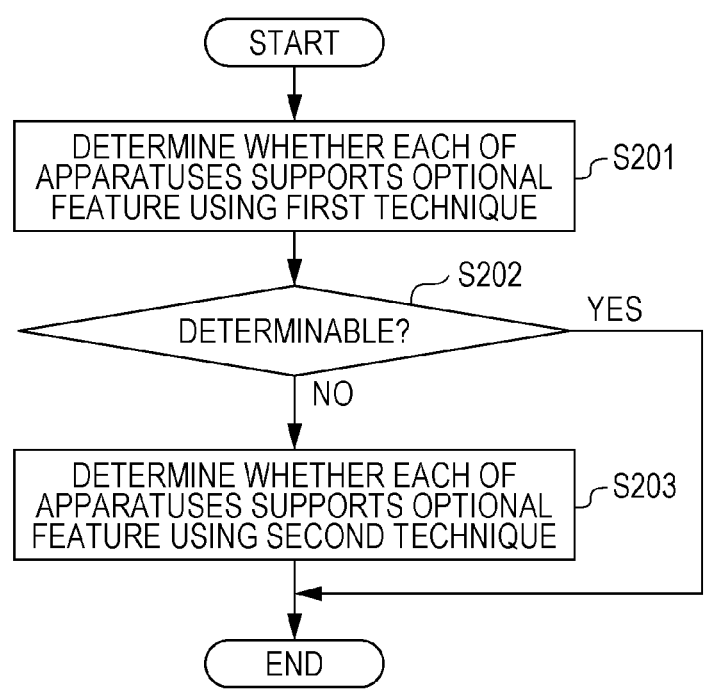
FIG. 16 is a flowchart of a process according to the embodiment.

As described above, the playback system 100 according to the present embodiment is a system including the playback apparatus 101 that plays back a video and the display apparatus 103 that displays the video played back by the playback apparatus 101. The playback system 100 performs the process illustrated in FIG. 16.

The playback system 100 (e.g., the playback apparatus 101) determines whether the playback apparatus 101 and the display apparatus 103 support the optional feature for video playback by using a first technique (S201). For example, by using the first technique, the playback apparatus 101 determines (1) whether the playback apparatus 101 supports the optional feature on the basis of the information held by the playback apparatus 101 and (2) whether the display apparatus 103 supports the optional feature on the basis of the information held by the display apparatus 103.

Subsequently, the playback system 100 determines whether it can be determined that the playback apparatus 101 and the display apparatus 103 support the optional feature by using the first technique (S202). If it is indeterminate whether the playback apparatus 101 and the display apparatus 103 support the optional feature by using the first technique (NO in S202), the playback system 100 determines whether the playback apparatus 101 and the display apparatus 103 support the optional feature by using a second technique that differs from the first technique (S203).

For example, as described in the second embodiment, according to the second technique, the playback system 100 outputs the information used to ask the user whether the playback apparatus 101 and the display apparatus 103 support the optional feature. More specifically, as illustrated in FIG. 15, according to the second technique, the playback system 100 plays back test content used by the user to determine whether the playback apparatus 101 and the display apparatus 103 support the optional feature.

Alternatively, as described in the first embodiment, according to the second technique, the playback apparatus 101 determines whether the playback apparatus 101 and the display apparatus 103 support the optional feature on the basis of the information held by the server 107 connected to the playback apparatus 101 via the network.

While the present disclosure has been described with reference to the playback systems according to the embodiments, the present disclosure is not limited thereto.

Typically, the processing unit included in each of the apparatuses included in the playback system according to the above-described embodiments is provided in the form of an LSI, which is an integrated circuit. The processing units may be individually provided as chips, or some or all of the processing units may be provided as one chip.

Note that the integration of the processing unit is not limited to the integration into an LSI. The processing unit may be configured using a dedicated circuit or a general-purpose processor. The processing unit may be integrated into an FPGA (Field Programmable Gate Array) that is programmable after the LSI is produced or a reconfigurable processor that allows the circuit cells in the LSI to be re-connected and allows the settings to be reconfigured.

Alternatively, in each of the above-described embodiments, each of the constituent elements may be achieved by dedicated hardware or by executing software program suitable for the constituent element. Still alternatively, each of the constituent elements may be achieved by a program execution unit, such as a CPU or a processor, that reads software program recorded in a recording medium, such as a hard disk or a semiconductor memory, and executes the software program.

In addition, the present disclosure may be the above-described program or a non-transitory computer-readable storage medium storing the above-described program. In addition, it should be noted that the above-described program can be distributed via a transmission medium, such as the Internet.

Furthermore, the structure of the functional blocks in the block diagrams is only an example. A plurality of functional blocks may be integrated into a single functional block, a single functional block may be divided into a plurality of blocks, or some of the functions may be moved to another functional block. In addition, the functions of a plurality of functional blocks having similar functions may be processed by the same hardware or software in parallel or in a time-multiplexing manner.

In addition, the sequence of the steps illustrated in the above-described flowcharts is an example for particularly describing the present disclosure. The sequence of the steps may be a sequence other than the above-described sequence. Furthermore, some of the steps may be performed simultaneously with another step (in parallel with another step).

While the playback system according to one or a plurality of aspects have been described with reference to the embodiments, the present disclosure is not limited thereto. A variety of modifications of the above-described embodiments that a person skilled in the art can conceive and an aspect realized by combining the constituent elements described in different embodiments may be encompassed within the scope of the one or the plurality of aspects.

The present disclosure is applicable to a playback system including a playback apparatus, such as a BD recorder, and a display apparatus, such as a TV set.

What is claimed is:

1. A computer-implemented method, comprising:
    detecting the presence of a video by a processor in a playback apparatus;
    determining, by the processor, whether a display apparatus that displays the video currently being played back by a playback apparatus on a display supports an optional feature for playback of the video by using a first technique;
    determining, by the processor, whether the display apparatus supports the optional feature for playback of the video by using a second technique that differs from the first technique, in case that it is indeterminate whether the display apparatus supports the optional feature by using the first technique; and
    executing the optional feature in the playback apparatus when the processor determines that the optional feature is supported for playback of the video using one of the first technique and the second technique.

2. The computer-implemented method according to claim 1,
    wherein in the first technique, it is determined whether the display apparatus supports the optional feature on the basis of information held by the display apparatus, and
    wherein in the second technique, information asking a user whether the display apparatus supports the optional feature is output.

3. The computer-implemented method according to claim 2,
    wherein in the second technique, test content used by the user to determine whether the display apparatus supports the optional feature is played back.

4. The computer-implemented method according to claim 1,
    wherein in the first technique, it is determined whether the display apparatus supports the optional feature on the basis of information held by the display apparatus, and
    wherein in the second technique, it is determined whether the display apparatus supports the optional feature on the basis of information held by a server connected to the playback apparatus via a network.

5. A playback apparatus for playing back video, comprising:
    a processor; and
    a memory having a program stored thereon, the program causing the processor to execute operations including
        detecting the presence of a video by a processor in a playback apparatus;
        determining, by the processor, whether the display apparatus that displays the video currently being played back by the playback apparatus on a display supports an optional feature for playback of the video by using a first technique;
        determining, by the processor, whether the display apparatus supports the optional feature by using a second technique that differs from the first technique, in case that it is indeterminate whether the display apparatus supports the optional feature by using the first technique; and
    executing the optional feature in the playback apparatus when the processor determines that the optional feature is supported for playback of the video using one of the first technique and the second technique.

6. A playback system, comprising:
    a playback apparatus that plays back video; and
    a display apparatus that displays the video currently being played back by the playback apparatus on a display,
    wherein the playback apparatus includes a processor and a memory having a program stored thereon, and
    wherein the program causes the processor to execute operations including
        detecting the presence of a video by a processor in a playback apparatus;
        determining whether the display apparatus that display the video currently being played back on the display apparatus supports an optional feature for playback of the video by using a first technique; and
        determining whether the display apparatus supports the optional feature by using a second technique that differs from the first technique, in case that it is indeterminate whether the display apparatus supports the optional feature by using the first technique; and
        executing the optional feature in the playback apparatus when the processor determines that the optional feature is supported for playback of the video using one of the first technique and the second technique.

* * * * *